(12) United States Patent
Stirner (10) Patent No.: US 12,440,814 B2
(45) Date of Patent: Oct. 14, 2025

(54) FEEDING SCREW MACHINE FOR FEEDING A PROCESSING SCREW MACHINE

(71) Applicant: Coperion GmbH, Stuttgart (DE)

(72) Inventor: Thorsten Stirner, Konigsbach-Stein (DE)

(73) Assignee: COPERION GMBH, Stuttgart (DE)

(*) Notice: Subject to any disclaimer, the term of this patent is extended or adjusted under 35 U.S.C. 154(b) by 772 days.

(21) Appl. No.: 17/549,445

(22) Filed: Dec. 13, 2021

(65) Prior Publication Data

US 2022/0184570 A1    Jun. 16, 2022

(30) Foreign Application Priority Data

Dec. 16, 2020 (EP) .................................. 20214537

(51) Int. Cl.
| | |
|---|---|
| *B29B 7/48* | (2006.01) |
| *B01F 23/47* | (2022.01) |
| *B01F 27/1143* | (2022.01) |
| *B01F 27/272* | (2022.01) |
| *B01F 35/11* | (2022.01) |
| *B01F 35/90* | (2022.01) |
| *B29B 7/42* | (2006.01) |
| *B29B 7/80* | (2006.01) |
| *B01F 101/00* | (2022.01) |

(52) U.S. Cl.
CPC .............. *B01F 35/11* (2022.01); *B01F 23/47* (2022.01); *B01F 27/1143* (2022.01); *B01F 27/2721* (2022.01); *B01F 35/90* (2022.01); *B29B 7/429* (2013.01); *B29B 7/489* (2013.01); *B29B 7/802* (2013.01); *B01F 2035/99* (2022.01); *B01F 2101/2805* (2022.01)

(58) Field of Classification Search
CPC .............................. B29B 7/487; B29B 7/802
USPC ................................ 366/78, 79, 84, 85, 133
See application file for complete search history.

(56) References Cited

U.S. PATENT DOCUMENTS

| 626,108 A | * | 5/1899 | Stuckel | ................... | B65G 33/34 |
| | | | | | 198/675 |
| 2,048,286 A | * | 7/1936 | Pease | ..................... | B30B 11/243 |
| | | | | | 366/85 |

(Continued)

FOREIGN PATENT DOCUMENTS

| CN | 2392661 Y | 8/2000 |
| CN | 206691901 U | 12/2017 |

(Continued)

OTHER PUBLICATIONS

EP20 214 5371 European Search Report dated May 27, 2021.

(Continued)

*Primary Examiner* — David L Sorkin
(74) *Attorney, Agent, or Firm* — DINSMORE & SHOHL LLP (57) ABSTRACT

A feeding screw machine serves for feeding a processing screw machine. The feeding screw machine comprises a housing with at least one housing bore formed therein. An associated screw conveyor shaft is rotatably disposed in the at least one housing bore to convey material in a conveying direction from a supply opening to a feeding opening. An emptying opening is formed in the housing. The emptying opening enables an easy, fast and reliable emptying and cleaning of the feeding screw machine independently of the processing screw machine.

17 Claims, 4 Drawing Sheets

(56) References Cited

U.S. PATENT DOCUMENTS

| | | | | | |
|---|---|---|---|---|---|
| 2,494,891 | A | * | 1/1950 | Marshall | C11D 17/02 510/145 |
| 3,632,256 | A | * | 1/1972 | Kasting | B29C 48/455 425/208 |
| 4,310,251 | A | * | 1/1982 | Scharer | B29C 48/38 366/85 |
| 4,959,186 | A | * | 9/1990 | Dollhopf | B29C 48/745 425/173 |
| 5,597,235 | A | * | 1/1997 | Barnes | B29C 48/92 366/76.6 |
| 6,682,213 | B2 | * | 1/2004 | Inoue | B29C 48/29 366/85 |
| 7,637,650 | B2 | * | 12/2009 | Ueda | B29C 48/41 366/77 |

FOREIGN PATENT DOCUMENTS

| | | | |
|---|---|---|---|
| CN | 206796491 | U | 12/2017 |
| CN | 107683198 | A | 2/2018 |
| CN | 207595903 | U | 7/2018 |
| CN | 109732872 | A | 5/2019 |
| EP | 0231034 | B1 | 3/1994 |
| EP | 2946904 | A1 | 11/2015 |
| EP | 3175967 | A1 | 6/2017 |
| EP | 3284566 | A1 | 2/2018 |
| WO | 2016-198223 | A1 | 12/2016 |

OTHER PUBLICATIONS

Office Action issued Jul. 31, 2025, in Chinese Patent Application No. 202111545773.4, filed Dec. 16, 2021 (with English-language translation).

* cited by examiner

FEEDING SCREW MACHINE FOR FEEDING A PROCESSING SCREW MACHINE

CROSS-REFERENCES TO RELATED APPLICATIONS

This application claims the priority of European Patent Application, Serial No. EP 20 214 537.1, filed Dec. 16, 2020, the content of which is incorporated herein by reference in its entirety as if fully set forth herein.

FIELD OF THE INVENTION

The invention relates to a feeding screw machine for feeding a processing screw machine. Furthermore, the invention relates to a processing installation and a method for operating a processing installation having such a feeding screw machine.

BACKGROUND OF THE INVENTION

A processing installation for preparing a styrene-acrylonitrile melt is known from EP 3 175 967 A1. The processing installation comprises a feeding screw machine which is connected laterally to a processing screw machine. By means of the feeding screw machine, rubber is fed into the processing screw machine.

SUMMARY OF THE INVENTION

It is an object of the invention to create a feeding screw machine for feeding a processing screw machine, which enables simple, fast and reliable cleaning.

This object is achieved by a feeding screw machine for feeding a processing screw machine with a housing, at least one housing bore formed in the housing, a supply opening formed in the housing for supplying material into the at least one housing bore, a feeding opening formed in the housing for feeding the material to a processing screw machine, and at least one screw conveyor shaft rotatably arranged in the at least one housing bore, for conveying the material in a conveying direction from the supply opening to the feeding opening, wherein an emptying opening is formed in the housing. Due to the fact that an emptying opening is formed in the housing of the feeding screw machine, emptying and cleaning the feeding screw machine independently of the processing screw machine is possible. The emptying opening penetrates the housing. The emptying opening connects the at least one housing bore to the environment. Material located in the at least one housing bore and/or cleaning agent located in the at least one housing bore may be discharged from the at least one housing bore through the emptying opening for cleaning or after cleaning. A complex discharging of material and/or cleaning agent via the processing screw machine is therefore not necessary.

Preferably, the feeding screw machine is designed as a side-feeding screw machine. The side-feeding screw machine allows for a lateral connection to the processing screw machine.

Preferably, at least two interpenetrating housing bores are formed in the housing. In particular, the cross-section of the at least two housing bores has the shape of a horizontal figure eight. Preferably, the feeding opening has the shape of a horizontal figure eight in cross-section. In particular, at least two associated screw conveyor shafts are rotatably arranged in the at least two housing bores. In particular, the at least two screw conveyor shafts are designed to be rotatably drivable in the same direction and/or to mesh tightly.

The feeding screw machine comprises at least one supply opening formed in the housing for supplying material. For example, the feeding screw machine may comprise a plurality of supply openings for supplying material components of the material into the at least one housing bore. Features relating to the supply opening apply in particular to the respective supply opening.

A feeding screw machine configured such that the emptying opening is arranged upstream of the feeding opening in the conveying direction ensures an easy, fast and reliable cleaning. The arrangement of the emptying opening ensures that no material and/or no cleaning agent has to be discharged through the processing screw machine. In a first embodiment, the emptying opening is arranged between the supply opening and the feeding opening as close as possible to the feeding opening, so that material and/or cleaning agent present in the feeding screw machine is discharged through the emptying opening before being supplied into the processing screw machine. In a second embodiment, the emptying opening is arranged upstream of the feeding opening and the supply opening in the conveying direction.

A feeding screw machine configured such that the emptying opening is arranged upstream of the supply opening in the conveying direction ensures an easy, fast and reliable cleaning. The emptying opening is arranged in the conveying direction upstream of the supply opening and the feeding opening, so that the emptying opening is not arranged between the feeding opening and the supply opening. Feeding of the processing screw machine can thus not be impaired by the emptying opening under any circumstances. For emptying and/or cleaning, the at least one screw conveyor shaft is rotationally driven in such a way that the feeding screw machine conveys in an emptying direction which is opposite to the conveying direction.

A feeding screw machine configured such that the emptying opening is formed on an underside of the housing ensures an easy, fast and reliable cleaning. Due to the fact that the emptying opening is formed on an underside of the housing, emptying material and/or cleaning agent is possible in a gravitationally supported manner. Due to the gravitational force, the material and/or cleaning agent to be emptied is discharged from the housing through the emptying opening.

A feeding screw machine comprising a closure element for opening and closing the emptying opening ensures an easy, fast and reliable cleaning. The closure element enables opening and closing of the emptying opening as required. In particular, the closure element enables a tight closure of the emptying opening so that cleaning agent or liquid cleaning agent cannot escape through the emptying opening. In the closed state of the emptying opening, the feeding screw machine can be cleaned extremely thoroughly, for example by alternately conveying cleaning agent in the conveying direction and in an opposite emptying direction. For emptying the cleaned contaminants and the cleaning agent, the emptying opening may then be released by opening the closure element and the cleaning agent can be discharged with the contaminants.

A feeding screw machine comprising a drive motor for driving the at least one screw conveyor shaft in rotation in a first direction of rotation and in an opposite second direction of rotation ensures an easy, fast and reliable cleaning. Due to the fact that the drive motor enables the at least one screw conveyor shaft to be driven in rotation in opposite directions of rotation, particularly thorough cleaning is possible. In the first direction of rotation, the at least one screw conveyor shaft conveys in the conveying direction, whereas in the second direction of rotation, the at least one screw conveyor shaft conveys in an opposite emptying direction. By alternately changing the directions of rotation, cleaning agent can be conveyed alternately in the conveying direction and in the emptying direction, so that the at least one screw conveyor shaft and/or a housing inner wall of the housing is intensively cleaned by alternately conveying the cleaning agent. The drive motor is particularly configured as an electric drive motor. In particular, the drive motor comprises a motor control for setting two opposite directions of motor rotation.

A feeding screw machine configured such that at least one auxiliary opening for cleaning and/or drying is formed in the housing ensures an easy, fast and reliable cleaning. The at least one auxiliary opening enables cleaning agent to be supplied into the housing or into the at least one housing bore in a flexible manner. The cleaning agent is, for example, in solid and/or liquid form. The cleaning agent comprises, for example, a cleaning granulate and/or a cleaning liquid. Furthermore, the at least one auxiliary opening enables a drying agent, for example a drying fluid and/or a heating fluid, to be supplied and/or discharged. Preferably, the at least one auxiliary opening is formed on an upper side of the housing. Preferably, the at least one auxiliary opening is formed offset from the emptying opening and/or the supply opening and/or the feeding opening in the conveying direction. For example, the at least one auxiliary opening is formed between the feeding opening and the supply opening and/or between the supply opening and the emptying opening and/or upstream of the emptying opening in the conveying direction.

A feeding screw machine comprising a drying device for drying the housing and/or the at least one screw conveyor shaft ensures an easy, fast and reliable cleaning. The drying device enables drying of the at least one screw conveyor shaft and/or a housing inner wall of the housing after a wet cleaning. Hereby, the feeding screw machine can be put back into operation in an easy and quick manner, so that the processing of material by means of the processing screw machine can be continued quickly. In particular, the drying device is integrated into the housing and/or in fluid communication with the housing and/or the at least one housing bore.

A feeding screw machine configured such that the drying device comprises a housing heater ensures an easy, fast and reliable cleaning. The housing heater enables a simple and fast drying of a housing inner wall of the housing and/or of the at least one screw conveyor shaft. In particular, the housing heater comprises electrical heating elements. The electrical heating elements are, for example, configured as resistance heating cartridges. The electrical heating elements are in particular arranged in housing recesses of the housing. The housing heater preferably comprises at least one fluid channel formed in the housing. Preferably, the housing heater comprises at least one fluid channel through which a heating fluid can flow. The heating fluid is preferably provided by a fluid flow generator connected to the at least one fluid channel.

A feeding screw machine comprising a fluid flow generator for cleaning and/or drying ensures an easy, fast and reliable cleaning. The fluid flow generator generates a flowing fluid for drying the at least one screw conveyor shaft and/or a housing inner wall of the housing. In particular, the fluid has an elevated temperature compared to the ambient temperature. The fluid is a liquid and/or a gas. The fluid flow generator is, for example, in communication with at least one fluid channel formed in the housing. The fluid flowing through the at least one fluid channel thus heats the housing for drying. The fluid flow generator is, for example, a pump. In particular, the fluid flow generator is in communication with the at least one housing bore. For example, the fluid flow generator is connected to at least one auxiliary opening of the housing. A gas, for example air, is guided through the at least one housing bore by means of the fluid flow generator, thereby drying the at least one screw conveyor shaft and/or the housing inner wall. The gas or air is in particular heated. The fluid flow generator is configured, for example, as a pressurized gas source. The fluid flow generator serves in particular to blow out the supply opening and an inlet hopper opening into the supply opening.

It is another object of the invention to create a processing installation which enables an easy, fast and reliable cleaning. In particular, the processing installation shall be cleanable with a short downtime.

This object is achieved by a processing installation with a processing screw machine for processing material, and a feeding screw machine for feeding the processing screw machine according to the invention. The advantages of the processing installation according to the invention correspond to the advantages of the feeding screw machine according to the invention, which have already been described. The processing installation may in particular be further developed with at least one feature described in connection with the feeding screw machine.

Due to the fact that the processing screw machine and the feeding screw machine can be cleaned independently of each other, the processing screw machine and/or the feeding screw machine can be cleaned as needed and in a time-optimized manner. In particular, the feeding screw machine does not have to be uncoupled or detached from the processing screw machine for emptying and/or cleaning. The feeding screw machine is firmly connected to the processing screw machine when being emptied and/or cleaned. The feeding screw machine is preferably designed as a side-feeding screw machine, which is connected laterally to the processing screw machine.

The processing screw machine is preferably designed as a multi-shaft screw machine. The processing screw machine comprises a housing with at least one housing bore. In the at least one housing bore, an associated treatment element shaft for preparing the supplied material is rotatably arranged. Preferably, at least two housing bores are formed in the housing which penetrate each other and have a cross-sectional shape of a horizontal figure eight. The at least two associated treatment element shafts are rotatably arranged in the at least two housing bores and are preferably rotatably drivable in the same directions of rotation. The at least two treatment element shafts are preferably designed to mesh tightly with each other. A material supply opening is formed in the housing, which is in communication with the feeding opening of the feeding screw machine. The material supply opening is loaded with the material to be processed by the feeding screw machine. Preferably, the material supply opening of the processing screw machine is formed laterally. The material supply opening corresponds in cross-section to the feeding opening.

A processing installation comprising a control device for setting an operating mode and a cleaning mode ensures an easy, fast and reliable cleaning. By means of the control device, an operating mode and a cleaning mode of the processing installation, in particular of the processing screw machine and/or of the feeding screw machine, can be set. In the operating mode, the feeding screw machine feeds the processing screw machine with material to be processed. If necessary, further material and/or at least one additive is supplied to the processing screw machine at other supply points. In the processing screw machine, the processing of the material follows. In the cleaning mode, the processing screw machine and/or the feeding screw machine is emptied and/or cleaned. Preferably, in the cleaning mode, material present in the feeding screw machine is discharged through the emptying opening without this material entering the processing screw machine. Preferably, in the cleaning mode, the feeding screw machine, at least temporarily, conveys the material in an emptying direction opposite to the conveying direction. For this purpose, the control device interacts with a motor control of a drive motor of the feeding screw machine. The cleaning mode comprises, in particular, cleaning and/or drying the at least one screw conveyor shaft and/or a housing inner wall of the housing of the feeding screw machine.

The invention is further based on the object of providing a method for operating a processing installation which enables an easy, fast and reliable cleaning of a feeding screw machine.

This object is achieved by a method for operating a processing installation, comprising the following steps: providing a processing installation according to the invention, and operating the processing installation in a cleaning mode, wherein in the cleaning mode material present in the feeding screw machine is discharged through the emptying opening, and the feeding screw machine is emptied. The advantages of the method according to the invention correspond to the advantages of the feeding screw machine according to the invention and the processing installation according to the invention, which have already been described. The method according to the invention may in particular be specified with at least one feature described above.

The processing installation is operated in one operating mode. In the operating mode, material to be processed is conveyed in the conveying direction by means of the feeding screw machine and supplied into the processing screw machine. In the cleaning mode, the processing screw machine and the feeding screw machine may be emptied and/or cleaned independently of each other. Material present in the feeding screw machine is discharged from the at least one housing bore through the emptying opening, and the feeding screw machine is emptied in this manner. The material in the feeding screw machine thus does not enter the processing screw machine in the cleaning mode. Cleaning agent that has been supplied into the feeding screw machine for cleaning can be discharged again through the emptying opening. It is not necessary to discharge cleaning agent through the processing screw machine. In the cleaning mode, the feeding screw machine is thus not separated from the processing screw machine, but is firmly connected thereto. Preferably, the processing screw machine is at least temporarily at a standstill in the cleaning mode.

A method designed such that in the cleaning mode, at least at times a direction of rotation of the at least one screw conveyor shaft is reversed with respect to an operating mode ensures an easy, fast and reliable cleaning. In the operating mode, the at least one screw conveyor shaft is rotationally driven in a first direction of rotation so that the material is supplied into the processing screw machine in the conveying direction. In the cleaning mode, the at least one screw conveyor shaft is rotationally driven, at least temporarily, in a second direction of rotation that is reverse to the first direction of rotation. As a result, the material is conveyed in an emptying direction that is opposite to the conveying direction. Conveying in the emptying direction reliably ensures that no material enters the processing screw machine in the cleaning mode. In particular, it is ensured that the material is discharged through the emptying opening. Preferably, the at least one screw conveyor shaft is rotationally driven alternately in the first direction of rotation and the second direction of rotation in the cleaning mode. This allows a cleaning agent to be conveyed between the feeding opening and the emptying opening alternately in the conveying direction and in the emptying direction, so that the cleaning agent cleans the at least one screw conveyor shaft and/or a housing inner wall of the housing multiple times.

A method designed such that the cleaning mode comprises a drying of the housing and the at least one screw conveyor shaft ensures an easy, fast and reliable cleaning. Drying the housing or a housing inner wall of the housing and/or the at least one screw conveyor shaft enables a short downtime of the processing installation and a quick restart after a wet cleaning. Drying is performed by means of a drying device. The drying device comprises in particular a housing heater and/or a fluid flow generator.

Further features, advantages and details of the invention will be apparent from the following description of several embodiments.

DESCRIPTION OF THE PREFERRED EMBODIMENTS

Figure 1:
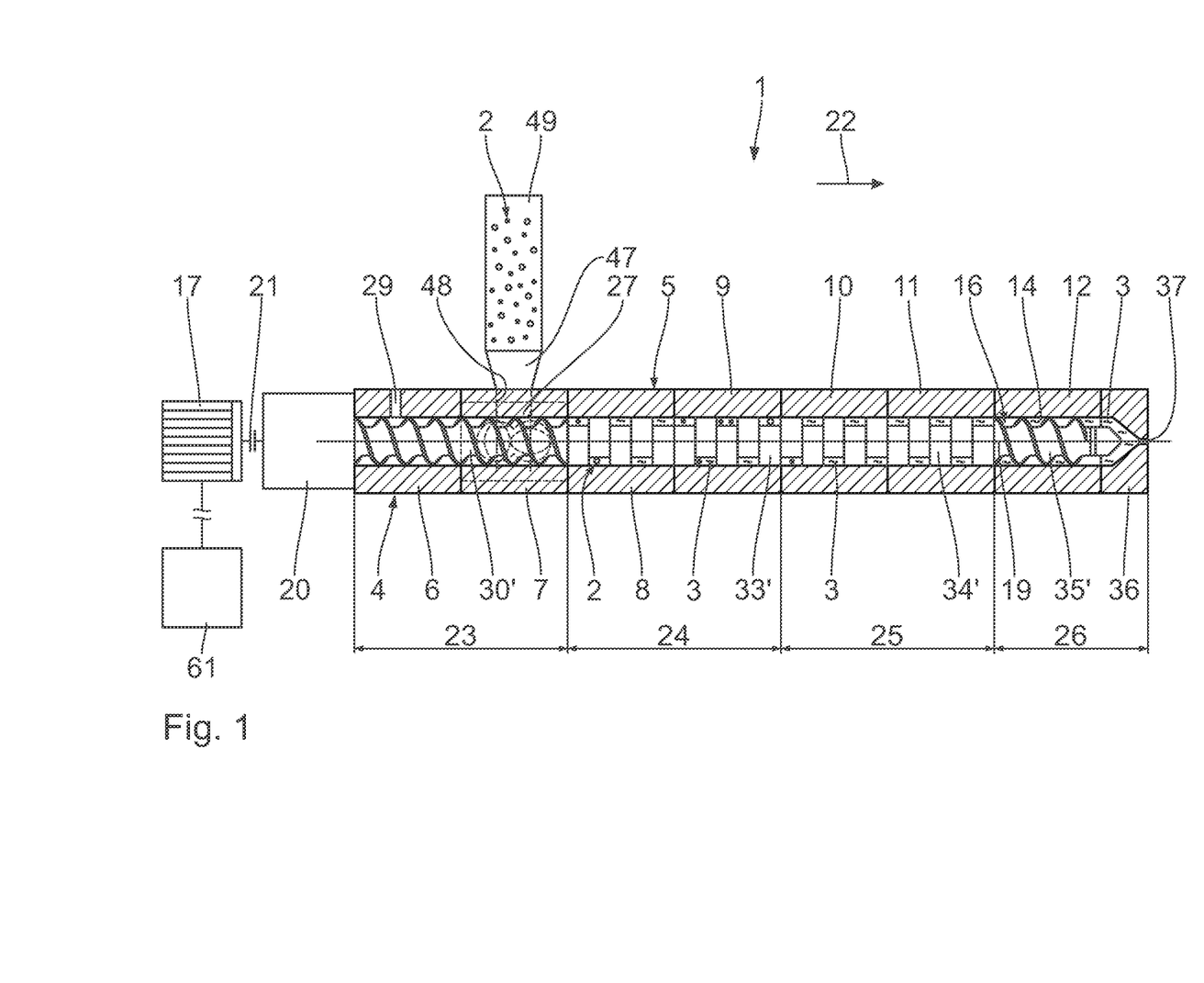
FIG. 1 a shows partially sectioned processing installation for producing a powder coating melt with a processing screw machine and a feeding screw machine according to a first embodiment.
Figure 2:
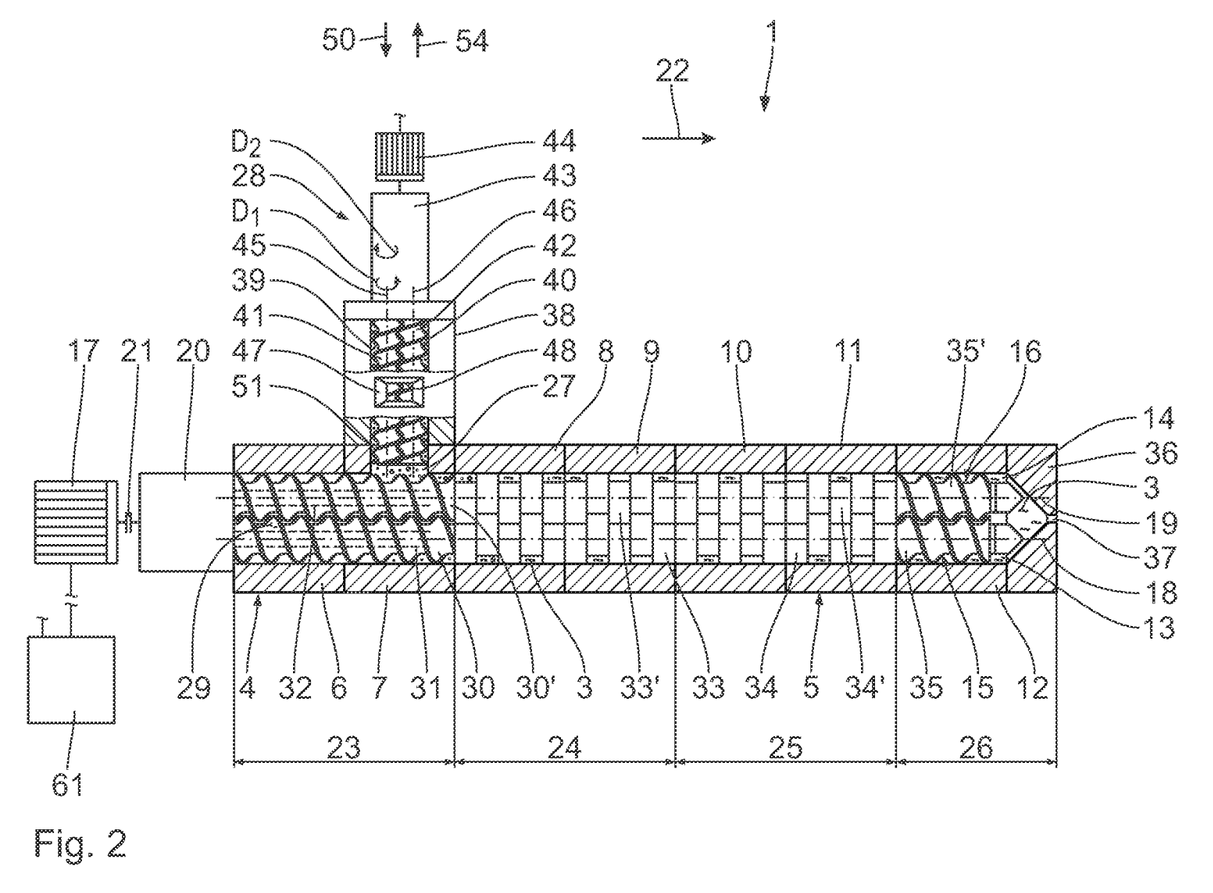
FIG. 2 shows a partially sectioned top view onto the processing installation in FIG. 1.
Figure 3:
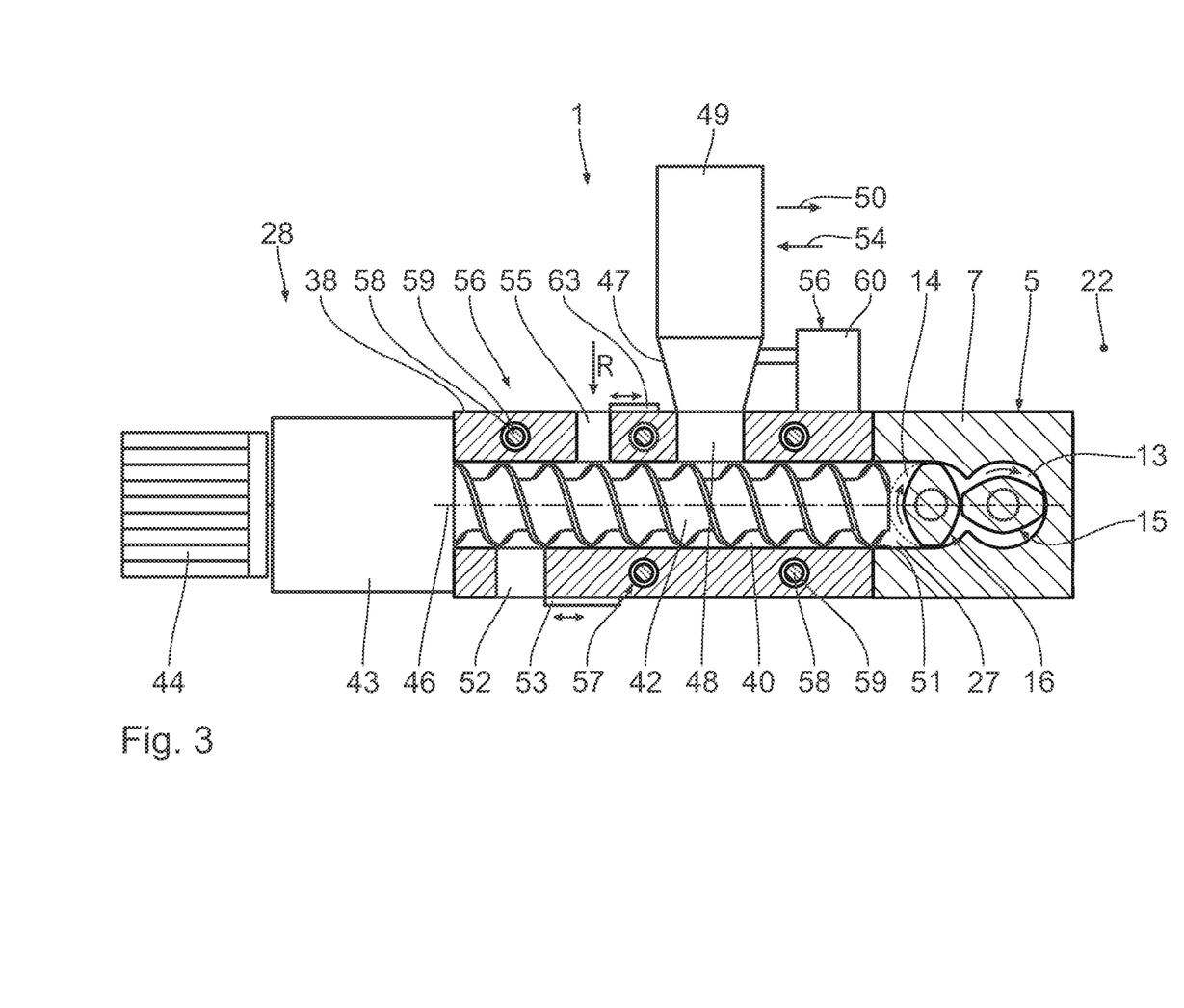
FIG. 3 shows a partially sectioned side view of the feeding screw machine in FIG. 2.

In the following, a first embodiment of the invention is described with reference to FIGS. 1 to 3. The processing installation 1 shown in the figures serves for preparing a powder coating premix 2 to form a powder coating melt 3. The powder coating premix 2 thus represents a material to be processed.

The processing installation 1 comprises a processing screw machine 4 having a housing 5 formed of a plurality of housing sections 6 to 12 arranged in succession. The housing sections 6 to 12 are connected to each other to form the housing 5. The processing screw machine 4 is formed as a multishaft screw machine. In the housing 5, two housing bores 13, 14 are formed, which are parallel to each other and interpenetrate each other and have the shape of a horizontal figure eight in cross-section. Concentrically arranged in the housing bores 13, 14 are two treatment element shafts 15, 16 which are rotatably drivable by a drive motor 17 about associated axes of rotation 18, 19. A branching gear 20 is arranged between the treatment element shafts 15, 16 and the drive motor 17. A coupling 21 is again arranged between the drive motor 17 and the branching gear 20. The treatment element shafts 15, 16 are driven in rotation concordantly, i.e. in the same directions of rotation about the axes of rotation 18, 19, by means of the drive motor 17.

The processing screw machine 4 has, in succession in a processing direction 22, an intake zone 23, a plasticizing zone 24, a homogenizing zone 25, and a discharge zone 26.

In the intake zone 23, the material to be processed is supplied to the processing screw machine 4 in the form of the powder coating premix 2. For this purpose, a material supply opening 27 is formed in the housing section 7. The material supply opening 27 extends laterally through the housing section 7 and opens into the housing bore 14.

For feeding the material to the processing screw machine 4, the processing installation 1 comprises a feeding screw machine 28. The feeding screw machine 28 is designed as a side-feeding screw machine. The feeding screw machine 28 is laterally connected or attached to the housing section 7.

In the intake zone 23, the powder coating premix 2 is conveyed to the plasticizing zone 24. Air contained in the powder coating premix 2 is discharged through a vent opening 29. The vent opening 29 is formed in the housing section 6. In the intake zone 23, the treatment element shafts 15, 16 comprise screw elements 30, 30' which are non-rotatably arranged on associated shafts 31, 32 and serve to convey the powder coating premix 2.

In the plasticizing zone 24, the supplied powder coating premix 2 is melted. For melting, kneading elements 33, 33' are arranged in a rotationally fixed manner on the shafts 31, 32 in the plasticizing zone 24. The kneading elements 33, 33' are designed as kneading discs. Preferably, kneading blocks are arranged on the shafts 31, 32 in the plasticizing zone 24 and comprise a plurality of kneading discs which are formed integrally with one another.

The powder coating premix 2 plasticized or melted in the plasticizing zone 24 is conveyed to the homogenizing zone 25. In the homogenization zone 25, the melted powder coating premix 2 or the powder coating melt 3 is homogenized. In the homogenization zone 25, kneading elements 34, 34' are arranged on the shafts 31, 32 in a rotationally fixed manner. The kneading elements 34, 34' are in particular designed as kneading discs. Preferably, kneading blocks are arranged in the homogenization zone 25, which are formed from a plurality of kneading discs which are integrally connected to one another.

In the discharge zone 26, the powder coating melt 3 is discharged. In the discharge zone 26, screw elements 35, 35' are arranged in a rotationally fixed manner on the shafts 31, 32 in order to convey the powder coating melt 3. A nozzle plate 36 is arranged on the last housing section 12, which forms a discharge opening 37.

After the powder coating melt 3 has been discharged, it is cooled in the usual manner. The cooled and solidified powder coating melt 3 is then milled into powder coating powder.

The feeding screw machine 28 is formed as a twin shaft side-feeding screw machine. The feeding screw machine 28 comprises a housing 38 with housing bores 39, 40 formed therein which penetrate each other and have a cross-sectional shape of a horizontal figure eight. Concentrically arranged in the housing bores 39, 40 are two screw conveyor shafts 41, 42 which are rotatably drivable in the same direction about associated axes of rotation 45, 46 via a branching gear 43 by means of a drive motor 44.

The feeding screw machine 28 comprises an inlet hopper 47 which opens into a supply opening 48. The supply opening 48 is formed at an upper side in the housing 38 and opens into the housing bores 39, 40. The material or the powder coating premix 2 is supplied through the supply opening 48 into the housing bores 39, 40. A metering device 49 meters the material or the powder coating premix 2 into the inlet hopper 47. A stirring device may be arranged in the inlet hopper 47.

In a first direction of rotation $D_1$, the screw conveyor shafts 41, 42 convey the material in a conveying direction 50 from the supply opening 48 to a feeding opening 51. The feeding opening 51 is formed at an end of the housing 38 facing the processing screw machine 4. The feeding opening 51 is formed and arranged in congruence with the material supply opening 27.

The screw conveyor shafts 41, 42 extend beyond the feeding opening 51 and open into the material supply opening 27. The feeding opening 51 thus serves for feeding the material or the powder coating premix 2 into the processing screw machine 4.

The feeding screw machine 28 comprises an emptying opening 52. The emptying opening 52 is formed on an underside of the housing 38. The emptying opening 52 opens into the housing bores 39, 40 and connects the housing bores 39, 40 to the environment. The emptying opening 52 is arranged upstream of the feeding opening 51 and the supply opening 48 in the conveying direction 50. The emptying opening 52 is thus arranged between the supply opening 48 and an end of the housing 38 facing the branching gear 43.

For opening and closing the emptying opening 52, the feeding screw machine 28 comprises a closure element 53. The closure element 53 is arranged on the housing 38. The closure element 53 is displaceable relative to the housing 38, for example linearly shiftable and/or pivotable. The closure element 53 is manually operable and/or operable by means of a drive not shown in more detail.

For emptying the feeding screw machine 28, the screw conveyor shafts 41, 42 are rotatably drivable by means of the drive motor 44 in a second direction of rotation $D_2$, which is opposite to the first direction of rotation $D_1$. When the screw conveyor shafts 41, 42 are driven in rotation in the second direction of rotation $D_2$, the feeding screw machine 28 conveys the material or the powder coating premix 2 in an emptying direction 54 which is opposite to the conveying direction 50.

For supplying a cleaning agent R, the feeding screw machine 28 has an auxiliary opening 55. The auxiliary opening 55 is formed on an upper side of the housing 38. The auxiliary opening 55 is arranged offset from the emptying opening 52 in the conveying direction 50. For example, the auxiliary opening 55 is arranged between the supply opening 48 and the emptying opening 52. Alternatively or additionally, an auxiliary opening may be arranged between the supply opening 48 and the feeding opening 51. For opening and closing the auxiliary opening 55, the feeding screw machine 28 comprises a closure element 63. The closure element 63 is displaceably arranged on the housing 38.

The feeding screw machine 28 comprises a drying device 56 for drying a housing inner wall of the housing 38 and the screw conveyor shafts 41, 42 after a wet cleaning. The drying device 56 comprises a housing heater 57 having a plurality of electrical heating elements 58 disposed in associated housing recesses 59. The heating elements 58 are configured, for example, as resistance heating cartridges.

For cleaning the inlet hopper 47 and the supply opening 48, the feeding screw machine 28 includes a fluid flow generator 60. The fluid flow generator 60 is configured as a pressurized gas generator. The fluid flow generator 60 is connected to the inlet hopper 47. The fluid flow generator 60 can be used to dry the housing inner wall and the screw conveyor shafts 41, 42 and is thus part of the drying device 56.

The processing installation 1 includes a control device 61 for setting an operating mode and a cleaning mode. The control device 61 is in signal communication with the drive motors 17, 44, the metering device 49, the drying device 56, the housing heater 57 and the fluid flow generator 60.

In the following, the operating principle of the processing installation 1 is described:

In the operating mode, the material to be processed or the powder coating premix 2 is supplied to the feeding screw machine 28 by means of the metering device 49 via the inlet hopper 47 and the supply opening 48. The feeding screw machine 28 conveys the material in the conveying direction 50 to the feeding opening 51. The drive motor 44 drives the screw conveyor shafts 41, 42 in the first direction of rotation $D_1$. The material is supplied into the housing bores 13, 14 of the processing screw machine 4 via the feeding opening 51 and the material supply opening 27.

In the processing screw machine 4, the material is conveyed in the processing direction 22 from the intake zone 23 to the plasticizing zone 24, where it is plasticized or melted. The powder coating melt 3 thus produced is conveyed to the homogenizing zone 25 and homogenized there. In the discharge zone 26, the powder coating melt 3 is discharged through the discharge opening 37 and then further processed in the usual manner.

In the event of a malfunction, for example an undesirable deviation in quality, or a change of material or of the powder coating premix 2, the processing installation 1 must be emptied and cleaned. For this purpose, the cleaning mode is set by means of the control device 61. In the cleaning mode, the processing screw machine 4 and the feeding screw machine 28 can be emptied and, if necessary, cleaned independently of each other. The emptying and cleaning of the processing screw machine 4 is carried out in the usual manner.

The feeding screw machine 28 is emptied independently of the processing screw machine 4. For this purpose, the emptying opening 52 is opened by displacing the closure element 53. The drive motor 44 drives the screw conveyor shafts 41, 42 in the second direction of rotation $D_2$ so that they convey in the emptying direction 54. The material present in the housing bores 39, 40 is conveyed in the emptying direction 54 to the emptying opening 52 where it is discharged from the housing 38 or the housing bores 39, 40 through the emptying opening 52. It is thus not necessary to empty the feeding screw machine 28 via the processing screw machine 4.

For cleaning the feeding screw machine 28, the inlet hopper 47 and the supply opening 48 are first blown out by means of the fluid flow generator 60. The fluid flow or the pressurized gas can escape through the emptying opening 52 and/or the auxiliary opening 55. For cleaning the housing inner wall and the screw conveyor shafts 41, 42, the emptying opening 52 is closed by means of the closure element 53. Subsequently, a cleaning agent R is supplied into the housing bores 39, 40 through the auxiliary opening 55. The cleaning agent R is selected, for example, from a cleaning liquid, for example water or a resin, and a cleaning granulate, for example a rubber granulate, a PP granulate or a PE granulate.

For cleaning, the direction of rotation $D_1$ or $D_2$ of the screw conveyor shafts 41, 42 is alternately changed so that the screw conveyor shafts 41, 42 alternately convey in the conveying direction 50 and the emptying direction 54. The cleaning agent R is thus conveyed between the auxiliary opening 55 or the emptying opening 52 and the feeding opening 51 alternately in the conveying direction 50 and the emptying direction 54. This results in an intensive cleaning of the housing inner wall and the screw conveyor shafts 41, 42. After cleaning, the cleaning agent R and cleaned contaminants are emptied through the emptying opening 52.

After wet cleaning has been carried out, the housing inner wall and the screw conveyor shafts 41, 42 are dried by means of the drying device 56. For this purpose, the housing heater 57 is switched on so that the electrical heating elements 58 heat the housing 38 and the housing bores 39, 40 formed therein. The heating dries housing the inner wall and the screw conveyor shafts 41, 42. The drying is assisted by the fluid flow generator 60 which generates a fluid flow in the housing bores 39, 40. The fluid flow or the pressurized gas flows into the housing bores 39, 40 via the supply opening 48 and from there to the feeding opening 51 and the auxiliary opening 55 as well as the emptying opening 52. After drying, the feeding screw machine 28 is ready for use again.

The feeding screw machine 28 thus enables an easy, fast and reliable cleaning, and enables an easy and fast restart of the processing installation 1 after a malfunction or a change of material.

Figure 4:
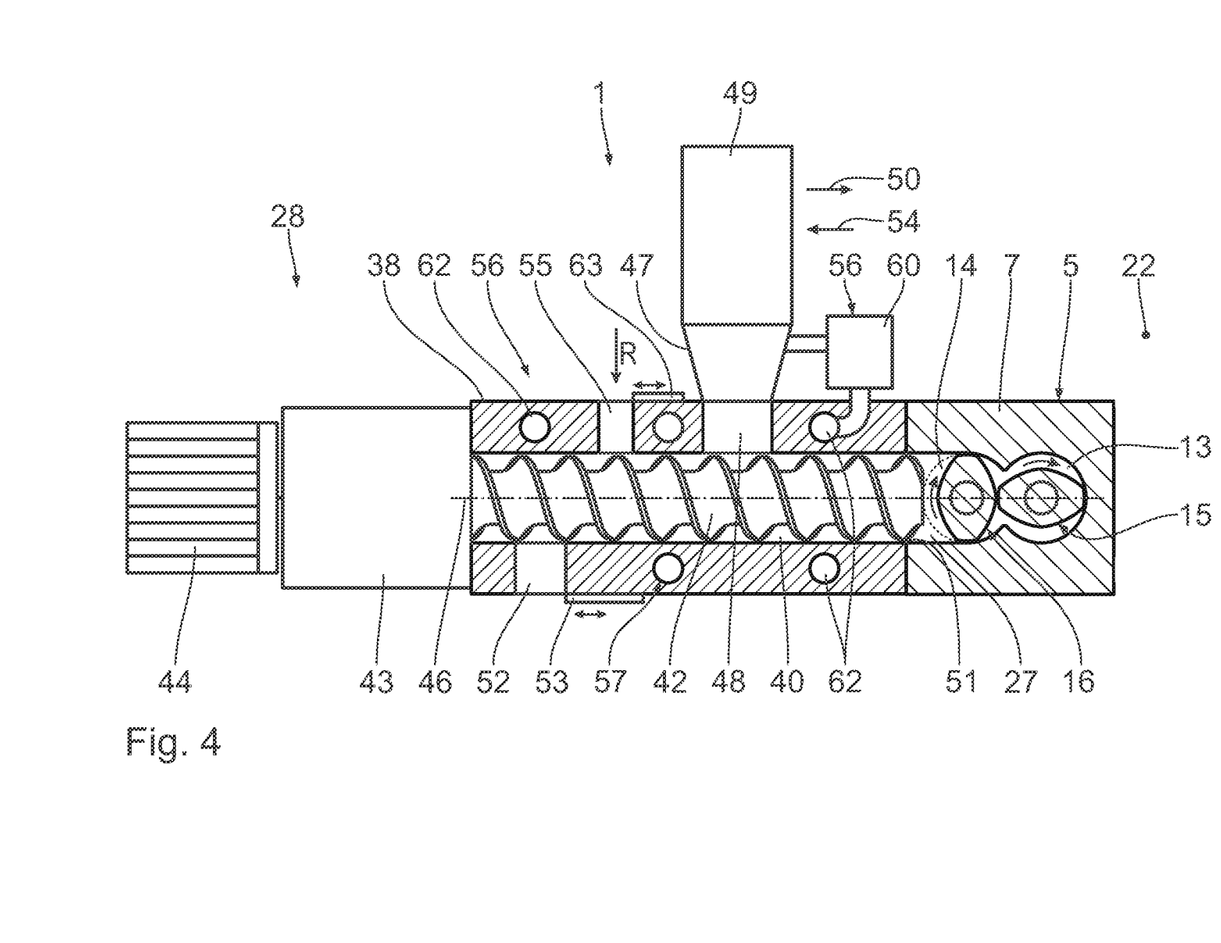
FIG. 4 shows a partially sectioned view of a feeding screw machine according to a second embodiment.

Referring now to FIG. 4, a second embodiment of the invention is described. Unlike the first embodiment, the housing heater 57 includes a fluid channel 62 formed in the housing 38. For heating the housing 38, a heated fluid flow is generated in the fluid channel 62 and in the housing bores 39, 40 by means of the fluid flow generator 60. For this purpose, the fluid flow generator comprises a fluid heater for providing a heated fluid or a heating fluid. With regard to the further construction of the processing installation 1 and the further operating principle, reference is made to the preceding embodiment.

In general:

The feeding screw machine 28 may be used to load any random material. The emptying opening 52 may be formed at any location in the housing 38, as viewed in the conveying direction 50. Preferably, the emptying opening 52 is formed on an underside of the housing 38 so that emptying of the material is possible due to the gravitational force acting thereon. A suction device may be connected to the emptying opening 52 and/or the auxiliary opening 55. The auxiliary opening 55 may be formed at any random location in the housing 38. A plurality of emptying openings 52 and/or a plurality of auxiliary openings 55 may be formed in the housing 38. The cleaning agent R may be supplied by means of nozzles.

What is claimed is:

1. A feeding screw machine for feeding a processing screw machine comprising:
   a housing,
   at least one housing bore formed in the housing,
   a supply opening formed in the housing for supplying material into the at least one housing bore,
   a feeding opening formed in the housing for feeding the material to the processing screw machine, and
   at least one screw conveyor shaft rotatably arranged in the at least one housing bore, for conveying the material in a conveying direction from the supply opening to the feeding opening,
   wherein an emptying opening is formed in the housing,
   wherein the emptying opening is arranged upstream of the supply opening in the conveying direction, wherein the at least one screw conveyor shaft extends in the at least one housing bore from the emptying opening to the feeding opening, and wherein the at least one screw conveyor shaft extends through the feeding opening and beyond the feeding opening.

2. The feeding screw machine according to claim 1, wherein the emptying opening is arranged upstream of the feeding opening in the conveying direction.

3. The feeding screw machine according to claim 1, wherein the emptying opening is formed on an underside of the housing.

4. The feeding screw machine according to claim 1, further comprising a closure element for opening and closing the emptying opening.

5. The feeding screw machine according to claim 1, further comprising a drive motor for driving the at least one screw conveyor shaft in rotation in a first direction of rotation and in an opposite second direction of rotation, wherein in the first direction of rotation, the at least one screw conveyor shaft conveys the material in the conveying direction from the supply opening to the feeding opening, and wherein in the opposite second direction of rotation, the at least one screw conveyor shaft conveys the material in an emptying direction opposite to the conveying direction from the feeding opening to the emptying opening.

6. The feeding screw machine according to claim 1, wherein at least one auxiliary opening for at least one of cleaning or drying is formed in the housing.

7. The feeding screw machine according to claim 1, further comprising a drying device for drying at least one of the housing or the at least one screw conveyor shaft.

8. The feeding screw machine according to claim 7, wherein the drying device comprises a housing heater.

9. The feeding screw machine according to claim 1, further comprising a fluid flow generator for at least one of cleaning or drying.

10. A processing installation comprising:
a processing screw machine for processing material, and
a feeding screw machine for feeding the processing screw machine,
wherein the feeding screw machine is a twin shaft side-feeding screw machine, the feeding screw machine comprising:
a housing,
two housing bores formed in the housing,
a supply opening formed in the housing for supplying material into the two housing bores,
a feeding opening formed in the housing for feeding the material to the processing screw machine, and
two screw conveyor shafts rotatably arranged in the two housing bores, for conveying the material in a conveying direction from the supply opening to the feeding opening,
wherein an emptying opening is formed in the housing,
wherein the emptying opening is arranged upstream of the supply opening in the conveying direction,
wherein the two screw conveyor shafts extend in the two housing bores from the emptying opening to the feeding opening, and
wherein the two screw conveyor shafts extend through the feeding opening and beyond the feeding opening,
wherein the two screw conveyor shafts extend into a material supply opening, the material supply opening being formed laterally in a housing of the processing screw machine.

11. The processing installation according to claim 10, further comprising a control device for setting an operating mode and a cleaning mode.

12. A method for operating a processing installation, comprising the following steps:
providing a processing installation according to claim 10, and
operating the processing installation in a cleaning mode, wherein in the cleaning mode material present in the feeding screw machine and in the material supply opening of the processing screw machine is discharged through the emptying opening, and the feeding screw machine is emptied.

13. The method according to claim 12, wherein in the cleaning mode, at least at times a direction of rotation of the two screw convenor shafts is reversed with respect to an operating mode.

14. The method according to claim 12, wherein the cleaning mode comprises a drying of at least one of the housing or the two screw convenor shafts.

15. The feeding screw machine according to claim 1, further comprising a branching gear, wherein the emptying opening is arranged between the supply opening and an end of the housing facing the branching gear.

16. The feeding screw machine according to claim 4, wherein the emptying opening is formed on an underside of the housing and the closure element is displaceable relative to the housing in a direction parallel to the conveying direction.

17. The feeding screw machine according to claim 5, wherein the drive motor comprises a motor control configured to set the first direction of rotation and the opposite second direction of rotation.

* * * * *